United States Patent [19]
Johnson

[11] 3,709,461
[45] Jan. 9, 1973

[54] PLUG VALVE HAVING A DUAL DIAPHRAGM THREE POSITION ACTUATOR

[75] Inventor: Jesse R. Johnson, Gowanda, N.Y.

[73] Assignee: AVM Corporation, Jamestown, N.Y.

[22] Filed: April 12, 1971

[21] Appl. No.: 132,958

Related U.S. Application Data

[60] Division of Ser. No. 723,862, April 24, 1968, Pat. No. 3,613,513.

[52] U.S. Cl. ..........................251/58, 251/61, 92/48
[51] Int. Cl. ....................F16k 31/165, F01b 19/00
[58] Field of Search ...............251/58, 61; 92/48, 49

[56] References Cited

UNITED STATES PATENTS

| 3,187,640 | 6/1965 | Young et al. | 92/48 |
| 2,973,181 | 2/1961 | Johnson | 251/317 X |
| 3,265,373 | 8/1966 | Walker et al. | 251/61 X |

Primary Examiner—Arnold Rosenthal
Attorney—Strauch, Nolan, Neale, Nies & Kurz

[57] ABSTRACT

A combined plug valve and dual diaphragm three position actuator assembly wherein the actuator comprises a two part housing having two diaphragms clamped therebetween, the diaphragms being separated by a spacer ring and a fluid communication passage therethrough to a chamber formed by the diaphram. Two more chambers are defined by the outer surfaces of the diaphragm and the housing, and each chamber has a fluid communication passage thereinto. Springs in two of the chambers bias the diaphragms apart; one spring is located between the two diaphragms and includes a collapsible link unit to limit separation of the diaphragms. An operator rod extends through the housing from one of the diaphragms and is secured to a rotary operative lever on the plug valve. Thus assembled, the actuator operates the valve through three positions.

10 Claims, 28 Drawing Figures

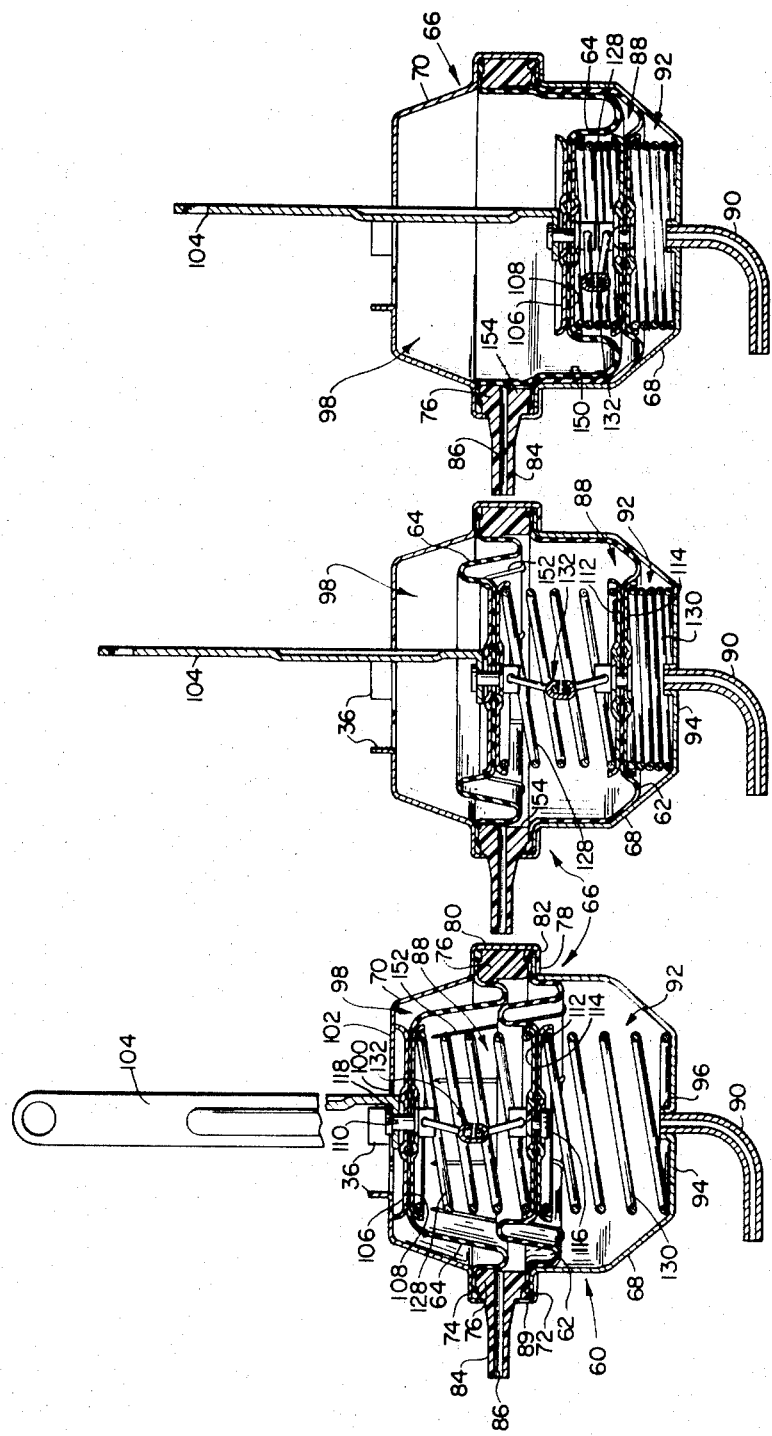

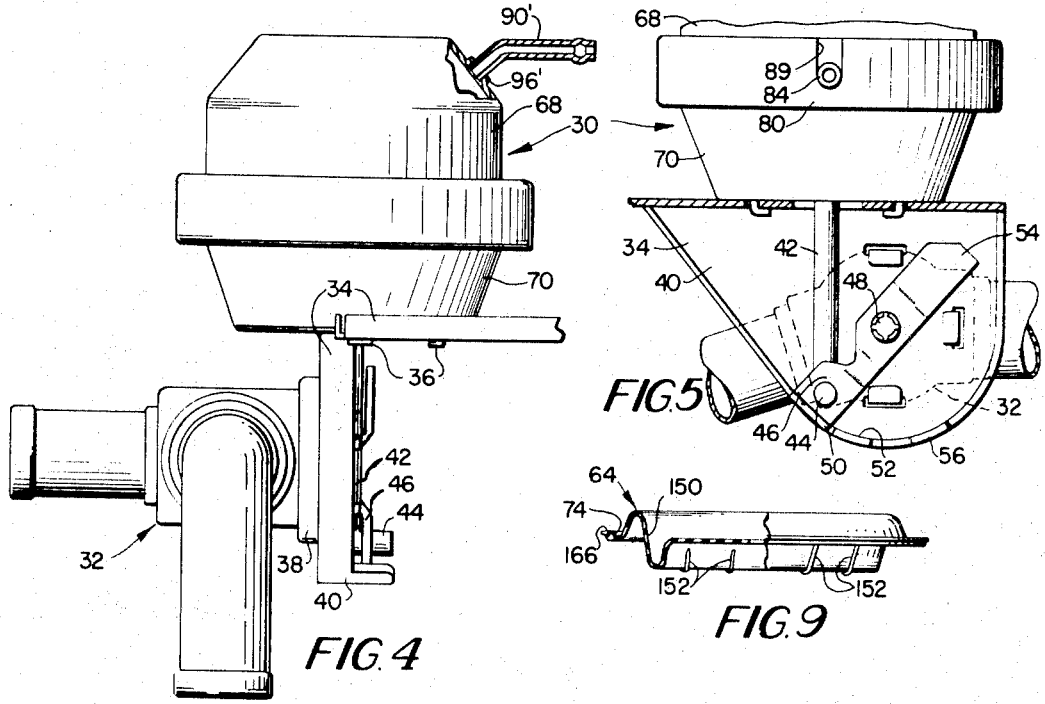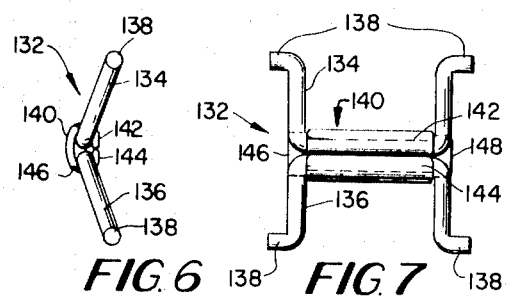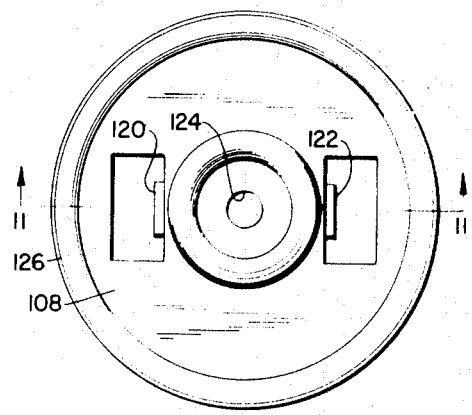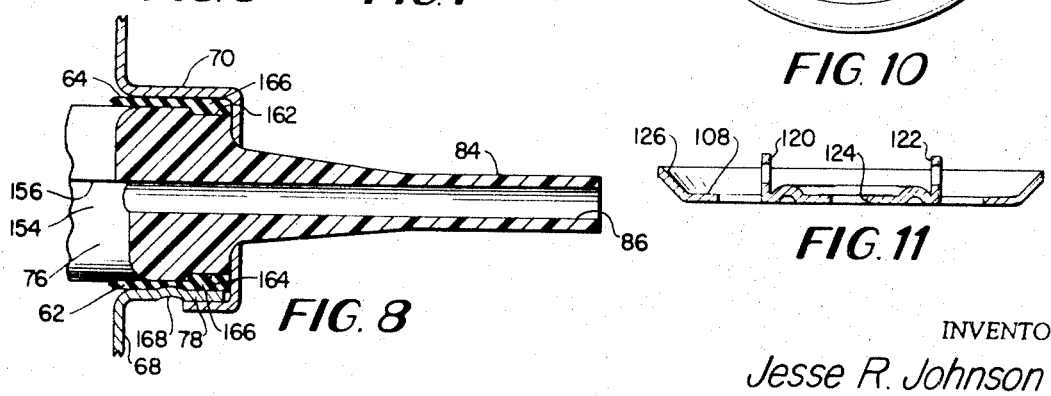

PATENTED JAN 9 1973　　　　　　　　　　　　　　　　　　　　3,709,461

INVENTOR
Jesse R. Johnson

BY Strauch, Nolan, Neale, Nies & Kurz
ATTORNEYS

PLUG VALVE HAVING A DUAL DIAPHRAGM THREE POSITION ACTUATOR

CROSS REFERENCE TO RELATED APPLICATION

This is a divisional application of Ser. No. 723,862, filed Apr. 24, 1968, now U.S. Pat. No. 3,613,513.

BACKGROUND OF THE INVENTION

This invention relates to combined multi-position expansible chamber actuators and plug valve assemblies, and more particularly to a three position actuator operatively connected to a three position plug valve, useful for controlling windshield wipers, fresh air dampers, and similar fluid flow apparatus on automotive equipment or other such structures.

Plug valves combined with differential or vacuum pressure expansible chamber motors to operate the valves are well known to those skilled in the art, and it has been previously proposed to utilize such assemblies particularly in the automotive field. However, a substantial majority of previously known multi-position vacuum actuated plug valve assemblies have not received widespread acceptance because of their complex construction both as to plug valve support and operator lever structure and actuator piping, internal valving, requisite external valving, and physical characteristics, primarily overall length of the actuator housing needed to accomodate components for three position actuation.

SUMMARY OF THE INVENTION

It is a principal object of the invention to provide a novel three-position vacuum actuated plug valve assembly having a minimum number of parts, being economical to manufacture, and having a substantially reduced overall length.

Another object resides in the provision of a three-position vacuum actuated plug valve assembly wherein the actuator comprises a housing enclosing two spaced diaphragms with a connection therebetween to a source of vacuum through an edge opening in the housing, one of the spaces defined by one diaphragm and the housing also having a through connection to a vacuum source.

Another object of the present invention resides in the provision of a dual diaphragm three position vacuum actuated plug valve assembly in which the operator rod from the actuator and the plug valve control lever are interconnected in such a manner as to avoid chatter and inaccurate plug valve positioning at a third, intermediate actuator position. More specifically, the interconnected relationship permits as much as a ten degree deflection from a straight push-pull path without affecting operational efficiency.

A still further object resides in the provision of a novel compact dual diaphragm three position actuated plug valve assembly including positive connections between the actuator operator rod and the plug valve control lever enabling three position control of the plug valve. In particular, the actuator operator rod is deflectable to establish an intermediate flow position in the plug valve, between its fully closed and fully open conditions.

Still another object of the present invention resides in the provision of a dual diaphragm multi-position actuated plug valve assembly wherein the diaphragms of the actuator include a lost motion collapsing link assembly therebetween to positively limit separation of the diaphragms one from the other, an operator rod being secured to one of the diaphragms and the control lever of the plug valve.

Other objects reside in the provision of a novel, highly compact three-position dual diaphragm actuated plug valve assembly wherein the actuator requires no external projection to accomodate the three position feature, the diaphragms are interconnected by a lost motion collapsing link assembly which can fold into minimum space normally existing between collapsed diaphragms, parts may be made of metal or non-metallic material depending on environmental operation conditions, and a spacer ring and additional spacing means may be provided between the diaphragms to prevent sealing engagement of one to the other when the space therebetween is evacuated.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings in which:

FIG. 1 is a sectional view of a preferred embodiment of an actuator made in accordance with the present invention, illustrating the extended position of the actuator operating rod when neither of the operating chambers have a vacuum source connected thereto;

FIG. 2 is a sectional view similar to FIG. 1 showing the operator rod and the two diaphragms in shifted position when the rear chamber is subjected to vacuum;

FIG. 3 is a sectional view similar to FIGS. 1 and 2 showing the position of the operator rod and diaphragms when vacuum is applied to the operating chambers (middle and rear) and the link assembly between diaphragms is in a fully collapsed condition;

FIG. 4 is a side elevation view showing a three position actuator assembled in combination with a valve controlled thereby in accord with the present invention;

FIG. 5 is a partial front elevation view of the assembly shown in FIG. 4 and illustrates the connection between the actuator operator rod and the valve plug rotating lever;

FIGS. 6 and 7 are enlarged side and front views, respectively, of the preferred metal embodiment of the collapsible link assembly;

FIG. 8 is an enlarged detail section through a portion of the actuator housing and spacer ring to illustrate details of the cooperating structure;

FIG. 9 is a partially sectioned side view of one of the diaphragms;

FIGS. 10 and 11 are enlarged plan and side views, respectively, of one embodiment of the diaphragm support discs which include collapsible link anchoring parts;

FIGS. 12–28, which illustrate various embodiments of collapsible link units as well as several suitable modifications of other actuator components, are generally described as follows:

FIGS. 12 through 14 illustrate use of a steel spacer ring and a molded non-metallic, X-shaped collapsible link unit;

FIGS. 15 and 16 are detail views which illustrate a double loop collapsible link unit constructed with molded, diamond shaped non-metallic units;

FIGS. 17 and 18 are detail views which illustrate a single wide band collapsible link unit made from non-metallic material;

FIGS. 19 and 20 are detail views which illustrate use of a non-metallic O-ring as the collapsible link unit between two diaphragms;

FIGS. 21 and 22 are enlarged O-ring sections illustrating fabric reinforced O-rings which can be used as the collapsible link unit shown in FIG. 20;

FIG. 23 depicts a thin flat plastic ring which can be used in lieu of the O-ring unit in FIG. 20;

FIGS. 24–27 are detail views illustrating metallic torsion spring embodiments of a collapsible link assembly, FIGS. 26 and 27 being enlarged plan views of the two different torsion springs which are used; and FIG. 28 is a perspective view of an alternative embodiment of the collapsible link diaphragm anchor disc which can be used in lieu of the diaphragm support disc shown in FIGS. 10 and 11.

With reference to FIGS. 4 and 5, a three position vacuum actuator or motor 30 is illustrated in assembly with a rotary plug valve 32, an example of which is depicted in U.S. Pat. No. 2,973,181. The combined actuator-valve assembly shown in FIG. 4 can be used in automotive heating systems and cooling systems, in which, for example, two different rates of flow of fluid through the valve as well as a valve shut-off condition are desired. The actuator could be used to operate something other than the depicted valve for example, and again referring to the automotive field, it may be used for setting the positions of heater duct dampers and outlet control doors. Suitable sources of vacuum, e.g., 10 to 20 inches Hg., are normally available in automotive installations and the present actuator can utilize such available vacuum pressures.

In the assembly shown in FIG. 4, both the actuator 30 and the valve 32 are mounted on a sheet metal support bracket 34, the actuator being secured by bent over lugs 36 which are part of the actuator housing, as will be more fully described, and the valve body 38 being similarly secured by bent lugs to a right angled platform portion 40 of the same bracket. In lieu of the lugs 36, threaded studs 37 (see FIG. 12) welded to the actuator housing can provide the means for fastening the actuator to a support structure. The actuator in FIGS. 4 and 5 is illustrated with an L-shaped round operator rod 42, its terminal end 44 being bent to provide a portion which fits into an aperture in and serves to operatively connect with the valve plug rotating lever 46. The valve plug stem 48 is secured to its operating lever 46 by staking. When the actuator operator rod 42 is in the extended condition, the valve is in its open condition with lever end 50 abutted against limit lug 52. When actuator 30 is moved to its other limit position, rod 42 is retracted causing valve operating lever 46 to swing and rotate the valve plug to a valve full closed condition in which the other end 54 of lever 46 will abut a second limit lug 56. The intermediate position of the three position actuator locates the valve lever 46, with the plug, intermediate the two limit conditions.

Upon reviewing FIG. 5, it will be understood that the actuator operator rod 42 must tilt, relative to its illustrated alignment with the inline axis of the actuator housing, as it is retracted and the valve lever 46 swings in an arc between its limit conditions. This feature of the actuator operator rod tilting or deviating from a straight line path is accommodated by the internal construction of the actuator and is now noted inasmuch as the exemplary actuator-valve assembly discloses one manner in which this ability, not normally present in three position actuators, can be utilized while avoiding the need for additional articulation links which are expensive and require added space.

Instead of making the actuator operator rod from round rod stock as shown in FIGS. 4, 5 and 12, it can be and is preferably made from flat bar stock in the manner of rod 104 shown in FIGS. 1, 2 and 3, the details of which will now be described.

Shown in FIGS. 1, 2 and 3, is a preferred construction of an actuator 60 which is functionally the same as actuator 30. Actuator 60 is a three position, dual diaphragm, spring return vacuum actuator, in which the two diaphragms 62 and 64 are contained within a two part casing or housing 66 consisting of a cup 68 and a cover 70. The housing parts can be pressed from sheet metal or molded from suitable plastics, the material used normally being dictated by the environmental temperature. The outer peripheries 72 and 74 respectively of the two diaphragms 62 and 64 are spaced apart by a spacer ring 76 and are clamped in sealed relationship between portions of the housing 66 and adjacent end surfaces of the spacer ring 76 when housing cover 70 is secured to the cup 68. Cup 68 has a lateral peripheral flange 78 which with the peripheries of the diaphragms and the spacer ring fit into a stepped peripheral construction 80 on the cover 70. The peripheral extremity 82 of cover 70 is bent inwardly, over the cup flange 78 and rigidly secures and sealingly clamps the two diaphragms and spacer in assembly within the housing.

A vacuum connector 84 extends outwardly from the outer periphery of the spacer ring 76 and provides a fluid passageway 86 from the exterior to the interior of the housing into the middle chamber 88 between the two diaphragms. Shown in FIG. 5, the stepped periphery 80 of cover 70 is notched at 89 to permit assembly of the component.

A second vacuum connector 90, fastened to the wall of cup 68, provides a fluid passageway from the exterior to the interior of the chamber 92 between the cup and diaphragm. (Chamber 92 for convenience will be designated the rear chamber). In the embodiment of FIGS. 1, 2 and 3, the end wall 94 of cup 68 is apertured with an inwardly directed slight extrusion 96 into which the end of connector 90 is fitted and suitably bonded. When both the cup and the connector are made from metal, as is preferable for higher temperature installations, the bonding can be made with silver solder. When cup and connector are made from plastic (lower temperature operating conditions) they can be molded as a unit or joined by suitable plastic bonding agents. Whenever the connection 90 is made through the cup end wall 94, the inward wall extrusions 96 can be tolerated and moreover provides a smooth finished appearance. Alternatively the vacuum connection 90' (FIG. 4) can be located through the side wall portion of the cup, in which case the pierced wall opening will have its edges 96' extruded outwardly to avoid interference with and damage to the rear chamber diaphragm, when it is pulled against the wall of the cup under application of vacuum.

In any case two connections for vacuum are provided, one to the middle chamber 88 and the other to the rear chamber 92. The chamber 98 (which will be designated as the front chamber for convenience) provided between the diaphragm 64 and cover 70 is open to ambient or atmospheric pressure through a cover opening, e.g., the central opening 100 in the cover end wall 102. The actuator operator rod 104, which is directly connected to front diaphragm 64, projects through the cover opening 100.

The inner peripheries of the two diaphragms 62 and 64 are firmly clamped between two metal support plates or discs made with slightly cupped outer peripheries. Disc plates 106 and 108 are coaxially clamped on the front diaphragm by a centrally located rivet 110 and disc plates 112 and 114 are clamped on the rear diaphragm by a centrally located rivet 116. The outer discs 106 and 114 are similar to each other and the respective inner or facing discs 108 and 112 are similar to each other. Rivet 116 merely serves only to clamp the rear discs 112 and 114 on the rear diaphragm whereas the slightly longer front rivet 110 also serves to secure the flat operator rod 104 to the front diaphragm, passing through an aperture in bent end 118 of rod 104, before it is riveted to tightly clamp the rod 104, discs 106 and 198 and diaphragm 64 as a unit. Even though the flat rod 104 is tightly secured by rivet 110 it can be swiveled by exerting a twist in order to vary its disposition to accommodate different installations. When a round rod operator link is used, as in FIGS. 4,5 and 12, its end is reduced and serves as the fastening member in lieu of rivet 110.

Inasmuch as the inner discs 108 and 112 are similar, a description of one disc 108, FIGS. 10 and 11, will suffice for both. Disc 108 has two integral bent up, apertured ears 120 and 122, the ear apertures being disposed on a diametral center line of the disc as seen in the FIG. 10 plan view and spaced on either side of the central rivet hole 124. Ears 120 and 122 on the two inner discs serve as anchor devices for a collapsible link unit which will be hereinafter described. The cupped outer periphery 126 of disc 108 is representative of all four of the diaphragm discs and in the case of three of the discs serve as a coil spring seat.

Returning to FIG. 1, the actuator contains two coil compression springs 128 and 103, spring 128 being placed between the two diaphragms, seated within the peripheries of the inner discs 108 and 112 and spring 130 being placed in the rear chamber with one end seated within the cupped periphery of disc 114. The end wall 94 of the housing cup 68 has a frustum shape to provide a spring seat for the other end of rear spring 130.

Spring 128 biases the two diaphragms 62 and 64 apart with sufficient force to enable operation, through the operator rod 104, of the unit being operated, e.g., provides a force sufficient to rotate the valve plug shown in FIGS. 4 and 5. Similarly, spring 130 biases the rear diaphragm 62 away from the rear wall 94 of cup 68 with substantially the same force as provided by spring 128. The spring forces for both springs are chosen so the springs will be readily compressed upon application of vacuum to the respective chambers in which they are disposed.

A collapsible link assembly or unit 132, located in the middle chamber 88, is fastened to each diaphragm by means of the support disc anchor ears 120 and 122 shown in FIGS. 10 and 11. In the preferred embodiment, collapsible link unit 132 (see FIGS. 6 and 7) is made from three pieces of steel, two of which are similar bail shaped wire links 134 and 136 and the third piece is a wide sheet metal link 140. The ends of the legs of both wire links 134 and 136 are bent outwardly to provide short pivot stubs 138. The two wire links 134 and 136 are pivotally secured to each other at their bight or mid-portion by a small sheet metal, formed link 140. Link 140 has central opposed edge flange portions 142 and 144 wrapped around the bights of the two wire bails to retain them in assembly and at the same time permit free relative pivoting between limits. At each end of the sheet metal retaining link 140, two integral tabs 146 and 148 extend beyond both sides of the bights of the two wire links, and serve as limit abutments for the legs of the two wire links 134 and 136. The tabs 146 and 148 have an intentional curvature which limits the outward pivoting of links 134 and 136 to approximately the 160° disposition shown in FIGS. 1, 2 and 6. The limit stop arrangement prevents a full 180° pivoting of the link unit 132 and avoids a dead center or over center disposition of the two wire links which could result in a condition where the link assembly would not collapse when the middle chamber is evacuated.

The bent stub ends 138 of the wire links pivotally fit into the apertured anchor ears 120 and 122 in the inner diaphragm discs 108 and 112 as shown in FIGS. 1, 2 and 3. Because of the resilience of the steel wire links, the pivot ends on the legs of each link can be squeezed slightly together and sprung into anchored disposition with associated ears 120 and 122 on the facing diaphragms support discs. This relationship can be visualized by viewing FIGS. 7 and 11 together.

Referring again to FIG. 1, the three piece collapsible link unit 132 fastened between diaphragms 62 and 64, being made from metal, provides a definite limit to the distance which the centers of diaphragms can be spaced apart due to force of the spring 128. The link unit serves as an articulated connection as well as to delimit a fixed distance between the diaphragm attached end of operator rod 104 and the rear diaphragm 67. Collapse of the link unit must be assured to permit the diaphragms to move toward each other, when vacuum is applied to the central chamber 88, at least to the limit permitted by compression of the coil spring 128.

The three positions of the actuator, from which it derives its type designation, are illustrated respectively in FIGS. 1, 2 and 3. Control of application of the vacuum or low pressure source will be via one or more manual or automatic control valves (not shown) as desired for the installation.

FIG. 1 represents the first position, the spring biased extended position of the actuator, in which there is no vacuum applied to either of connectors 84 or 90, the lines (not shown) which fasten to such connectors being opened to ambient pressure surrounding the actuator itself. Pressures being equalized on both sides of both diaphragms, the bias of spring 128 against the support discs of both diaphragms will force them apart to the limit distance permitted by collapsible link unit 132 and at the same time rear spring 130 will force the rear diaphragms via its support discs toward the cover end of the housing. This combined spring force results in the front diaphragm disc 106 moving to abut against the cover end wall 102, at which limit, the attached operator rod 104 is moved out to its fully extended position. The force exerted by the springs to urge the operator rod 104 to its extended position will be selected as desired for a particular installation. One installation in which the actuator will actually be used requires at least a 3.5 pound force to be exerted in urging the actuator rod to extended position, hence the spring compression force of each spring would be at least 3.5 pounds. While it is preferred that the actuator be a complete bi-directional motor with self contained springs for urging the actuator operating rod in the one direction, the springs could be omitted from inside of the actuator housing, in which event the component being operated could be spring loaded to pull the operator rod 104 to the extended limit position shown in FIG. 1, and vacuum operation of the actuator would work in opposition to the external spring.

FIG. 2 illustrates the No. 2 or intermediate actuator position wherein a source of vacuum has been connected to the rear chamber 92 via connector 90 permitting differential pressure across the rear diaphragm 62 to force diaphragm 62 toward the rear wall 94 of the cup to its position as limited by compression of the coil spring 130. This movement of diaphragm 62 is transmitted through its support discs 112 and 114 and the collapsible link unit 132 (which will now be fully extended) to pull the front diaphragm 64, through its support discs, toward the rear wall 94 and thereby retract the operator rod 104 to its intermediate position. The vacuum source must provide a pressure differential, relative to ambient pressure, which when applied to the effective pressure area of the diaphragm 62 will exert enough force to overcome the bias of spring 130 and still provide the requisite specified pulling force on the actuator rod 104. FIG. 2 also clearly illustrates that the wall of diaphragm 62 conforms closely against the inside surface of the cup 68 as it moves toward the rear wall 94. While this is normal in such diaphragm motors, and causes no problem, the situation is different and there can be a problem in connection with movement of the front diaphragm 64 as will be described in the next portion pertaining to the No. 3 position.

To shift to the No. 3 position shown in FIG. 3, the vacuum source is applied to both the rear chamber 92 and the middle chamber 88, via respective connectors 90 and 84. Applying or continuing the connection of vacuum to connector 90 evacuates the rear chamber 92 placing the rear diaphragm 62 in the condition previously described for position No. 2. Evacuation of the middle chamber 88 through the connection 84 and passageway 86 in spacer ring 76 causes a pressure differential across the front diaphragm 64 to move it from the cover toward the rear diaphragm 62, compressing the coil spring 128 to its compact limit condition as shown in FIG. 3. As the diaphragm 64 moves closer to diaphragm 62, its support discs 106 and 108 force the link unit 132 to collapse to its folded condition and at the same time retract the operator rod 104 into the housing 66 to its maximum retract position No. 3. It should be apparent that the precise location of the No. 3 position can be changed by using a different number of coils in either or both of springs 128 and 130 and that the precise location of the No. 2 position can be changed by using a different number of coils in spring 130 or by changing the length of the legs on the wire form links in the link unit 132.

The previously mentioned problem which can be encountered in connection with front diaphragm 64 is occasioned by the fact that as the diaphragm moves toward the rear with middle chamber 88 connected to a vacuum source, the diaphragm wall 150 rolls across and attempts to conform to the surface of the inner periphery of the spacer ring 76 and as its movement progresses it progressively moves into tight conformity with the front surface of the rear diaphragm 62 which will be flat against the inner side surface of the cup 68. The conformity of the flexible diaphragm wall against the spacer surface could immediately shut off the passageway 86 and prevent further evacuation of the middle chamber 88. To alleviate blocking of the outlet passage 86, at least the front diaphragm 62 is provided on its rear surface with a series of spaced apart small radial ribs 152 (seen in FIGS. 1, 2 and 9) which will create multiple radial passageways between overlapped surfaces to allow air to be exhausted from chamber 88 between the two engaged diaphragms.

To further assure that evacuation blocking does not occur, the spacer ring inner periphery is relieved. A preferred manner of relief is to undercut a portion 154 (see FIG. 8) of the inner periphery of spacer ring 76. Such an undercut portion is shown disposed closest to the rear diaphragm 62, although it can be disposed either way, and will intersect the lateral passageway 86. When the front diaphragm 64 in its initial movement rolls over the step 156 formed by the undercut 154, it will not conform into a small annular passageway along the corner of the undercut 154. Since the annular corner passage connects with the passageway 86, blocking or sealing off of the passageway 86 by the diaphragm 62 is prevented. An alternative expedient is shown in FIG. 12 where an annular groove 158 is provided around the inner periphery of the spacer ring. The undercut or stepped embodiment is preferred as it more readily lends itself to inexpensive molding of the spacer ring from plastics than does the groove embodiment. Also, when steel rings are used, the undercut can be machined more readily than the internal groove.

Shown in the sectioned detail view of FIG. 8, both the upper and lower surfaces of spacer ring 76, at the outer peripheral edge of the ring, are provided with annular recesses 162 and 164 which, in clamped assembly, cooperate with an annular bead 166 on the outer periphery of the respective diaphragms. This relationship assures that the diaphragms are not only sealingly clamped but are also effectively gripped at its outer periphery to prevent their peripheries from being pulled out from clamped assembly. As an additional gripping aspect, an annular rib can be formed in the cooperating surfaces of the cup 68 and cover 70, e.g., the rib 168 in flange 78 of cup 68 is shown in FIG. 8, and such a rib 168 will provide a pressure fit around the periphery of the diaphragm and against the spacer ring radially inward of the diaphragm head 166.

The spacer ring 76 provides a stable rigid clamping structure which can be satisfactorily accomplished with rings made from metal or plastic. Steel spacer rings are desirable where temperature conditions approximate 265°F. or above whereas plastics have been successful and found to be fully acceptable for environmental temperatures up to 220°F. One plastic material found to be very satisfactory by itself and more so when fiber glass filled is "CELCON," an ethyl cellulose thermoplastic.

The diaphragms can be made from rubber or similar materials as required to withstand conditions for various installations. A highly satisfactory oil and temperature resistant material for the diaphragms in actuators used in the automotive field has been found to be a synthetic made from ethylene propylene by Vernay Laboratories, Inc., Yellow Springs, Ohio. It is known to the trade as EPT rubber.

Different structural embodiments of collapsible link units coupled between the two diaphragms in the three position actuator of the present invention are shown in FIGS. 12–27. Some of the collapsible link units are made from non-metallic materials and represent initial stages in the developments which culminated in the preferred embodiment of the three piece steel link unit, hereinbefore described.

FIG. 12, along with FIGS. 13 and 14 illustrate an embodiment of the three position actuator which utilizes a rubber X-shaped collapsible link unit 172. The unit 172 is molded from a rubber material with minimum stretch characteristics. The molded end tabs 174 on the legs of unit 172 are clamped under bent over integral punched tabs 176 in the opposed diaphragm support discs.

FIGS. 15 and 16 illustrate a pair of what, for convenience, will be termed diamond links 180 and 182 which, like the X-link 172, are molded from rubber. In this embodiment of collapsible link assembly, auxiliary double hook plates 184 and 186 are secured respectively against each of the opposing diaphragm support discs by the support disc rivet connection and the ends of the diamond links 180 and 182 are looped and firmly fastened under the hooked ends of plates 184 and 186, as shown in FIG. 15.

FIGS. 17 and 18 illustrate the use of a wide rubber band 190 as the collapsible link. The band 190 is pierced by apertures 192 and 194 at diametrically opposite locations. The rivet members of the two diaphragms are used to secure the band 190 between the diaphragms, the rivets passing through the respective rubber bands apertures 192 and 194 and respective small clamping plates 196 and 198 before being riveted to securely clamp the plate 196 and 198, the band 190, the diaphragm and its discs together. The edges of the clamping plates 196 and 198 are bent up as at 199 and have a smooth finish to prevent damage to the rubber band 190. Instead of being bent at 199, the edges of the small clamp plates may be chamfered.

While all of the X-shaped link unit 172, the diamond shaped link units 180 and 182 and the rubber band link unit 190 exhibit some stretch characteristics and are not intended to be used under extremes of load and temperature conditions they are satisfactory to provide a collapsible connection having a determined maximum spacing within certain tolerances between the two diaphragms to accomplish the three position operating function of the actuator under some conditions.

FIGS. 19–23 represent several non-metallic collapsible embodiments which exhibit ability to withstand more extreme conditions of temperature and force than do the other rubber link units 172, 180 and 190, although again these embodiments, using presently known materials, will not be used under extremes of temperature conditions to which many automotive components are subjected.

FIG. 19 illustrates a collapsible link unit in which a single rubber O-ring 210 is hooked in a bungee arrangement over double hook plates 212 and 214 secured by riveting against the opposed diaphragm support discs in a manner similar to the hook plates in FIG. 15, although the hook plates will be arranged transverse to each to readily accommodate the looped arrangement of the O-ring. To enable this embodiment of collapsible link unit to be used in actuators operating under somewhat greater load forces without stretching and exceeding the desired maximum spacing limit between diaphragms, the rubber O-ring may be reinforced with a fabric material, along the inner or outer periphery of O-ring 210' as shown at 216 in FIG. 21 or as a central core 218 of O-ring 210'' as shown in FIG. 22.

A further embodiment which exhibits characteristics similar to the O-rings is a flat polypropolene ring 220 shown in FIG. 23. This ring is installed as a collapsible link unit in the same manner as hereinbefore in connection for O-ring 210.

A further embodiment of the collapsible link which exhibits satisfactory and acceptable characteristics under all specified extremes of automotive operating conditions is the metal torsion link embodiment illustrated in FIGS. 24–27. While substantially more expensive than the three piece steel link unit 132, the torsion link unit 230 is considered to have substantially the same reliability and will provide a pre-determined maximum spacing distance between diaphragm support discs within the very close tolerances provided by the three piece steel link unit 132.

The torsion spring link unit 230 consists of two dissimilar small coiled torsion springs 232 and 234 with associated steel wire anchors 236 and 238. Springs 232 and 234, as seen in FIGS. 26 and 27, are coiled in opposite directions and in the relaxed spring condition have their two terminal legs 240, 242 and 244, 246 extending in opposite directions from the ends of the respective coils and disposed essentially in the same plane. The ends 241 and 243 of respective legs of coil spring 232 are made into loops which bend inwardly toward each other (FIG. 26) whereas the loop ends 245 and 247 of respective legs 244 and 246 of coil spring 234 coil in the same direction as does their coiled spring which makes them essentially perpendicular to the plane of their legs (FIG. 27). Such dissimilarity will better accomodate coupling of the two springs. FIG. 25 illustrates the manner in which the two spring units 232 and 234 are fastened together, loops 241 and 245 being linked together and loops 243 and 247 being linked together and all leg loops being bent sufficiently to prevent separation. FIG. 25 also illustrates the appearance of the torsion spring link unit in its collapsed condition.

With the two springs of the torsion spring link unit 230 assembled as shown in FIG. 25, it will be connected, within the diaphragm biasing spring 128', to the opposed diaphragm support discs 250 and 252. Each diaphragm 62 and 64 with its two support discs having been previously riveted in assembly. The outer discs and the operator rod and its connection are all similar to the assembly described in conjunction with FIG. 1. The inner anchor discs 250 and 252 (the ones which oppose each other in the assembled double diaphragm) are similar. One such disc 250 is shown in FIG. 28 and has its anchor portions made by piercing and deforming two diametrally located strips of the disc metal upward to form upstanding anchor loops 254 and 256 spaced a sufficient distance apart to accommodate the coiled portion of one of springs 232 and 234 between them. In FIG. 24, one spring 232 is anchored between strip loops 254 and 256 of the disc 250 by slipping the short length of steel wire anchor 236 under one loop, through the spring coil and then under the other loop. The extremities of the wire anchor 236 are then bent over close to the loops to prevent its dislodgement and to prevent engagement with and damage to the diaphragms. The other spring 234 is anchored to disc 252 by its anchor wire 238 in a manner similar to that just described.

This embodiment of anchor disc 250 constitutes one way of providing anchor components in the opposing diaphragm support plates and can be used as an alternative to the punched out and bent up apertured ears 120 and 122 of the hereinbefore described anchor disc 108 shown in FIGS. 10 and 11. An important advantage of the construction of anchor disc 250 is that, using mass production techniques, the slightly less expense per unit will result in substantial savings.

Because of the manner in which the two springs of the torsion spring collapsible link unit 230 are interconnected, their normal torsion bias will be toward the collapsed condition seen in FIG. 25. The torsion bias force of the two springs 232 and 234 is substantially less than the force of compression coil spring 128' located between the two diaphragms which shifts the coil portions of torsion springs to the disposition shown in FIG. 23 where each of the interconnected pairs of legs have an angular disposition approximately like that of the open wire form link 132 seen in FIG. 2. In the opened link condition, the torsion spring legs, being biased back toward their collapsed planar condition, can never reach a dead center condition and moreover will always move immediately toward collapsed condition under the torsion bias when a vacuum source is applied to the middle chamber, between the diaphragms.

Although the hereinbefore described internal springs 128 and 130 are straight coil springs, they could be cone shaped springs. The advantage of the straight spring is that the rate of change of power of the spring is considerably less with a straight spring than with a cone spring. Thus the advantage accruing to the actuator by use of straight coil springs is a nearer uniform power with a given amount of vacuum at both ends of the travel.

The disadvantage of the straight spring as against the cone shape spring is that in closed position a cone shape spring is the thickness of the wire diameter while the straight spring in its closed position is considerably longer as is shown in FIG. 3. This feature of a cone spring will permit a shorter cup or housing. The straight spring provides better performance whereas a cone shape permits use of a smaller housing.

The basic three position actuator can be used without using either of the internal springs 128 and 130 or an external spring (as was described hereinbefore). Vacuum can be used in lieu of such internal springs and will avoid loss of the built-in spring force which must be overcome by the operating vacuum. In such an embodiment, the round rod arm such as rod 42 is used with a shiftable seal arrangement provided between the front chamber wall and the round rod arm, and a vacuum connector is attached to the wall of the front chamber similar to connector 90 as described for the rear chamber. Operating vacuum is then selectively applied to the front chamber as well as to the rear and middle chambers to cause actuator shift from and to all three positions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The combination of a rotary plug valve, a multi-position expansible chamber vacuum actuator and a common support mounting both said valve and actuator in assembled operative relationship; said valve including a housing rigidly secured to said support and a control lever to rotate said plug; said actuator comprising housing means secured to said support, at least two diaphragms secured within said housing to define two vacuum operating chambers, one of said chambers located in the space between the two diaphragms, said diaphragms cooperating with said housing to provide fluid tight isolation between said operating chambers, means providing fluid communication through said housing into each of said operating chambers from the exterior of said housing, motion transmitting means secured at one end to one of said diaphragms exterior of said two operating chambers and projecting exterior of said housing, means coacting with said diaphragms urging them in a direction causing maximum extension of said motion transmitting means from said housing including a collapsible device located between and connected to both of said diaphragms enabling said diaphragms to move relatively toward and away from each other between a substantially fixed maximum distance at least when one of said chambers is selectively subjected to vacuum and a closely spaced adjacent disposition of said two diaphragms at the end of said housing means opposite the motion transmitting means when both of said chambers are subjected to vacuum; a pivot connection between the other end of said motion transmitting means and said plug control lever; and said collapsible device permitting tilting of at least said one of said diaphragms and said motion transmitting means relative to said actuator housing means to accommodate an arcuate swinging of said pivot connection about the axis of the rotary plug of said rotary plug valve as the actuator moves said rotary plug through an intermediate flow control position between its operating limit positions.

2. The plug valve and actuator combination as deffined in claim 1, wherein said collapsible device located between and connected to said two diaphragms comprises diaphragm support plate means secured to each of said diaphragms in facing relationship, anchor means on each of said support plate means, a collapsing link secured to both of said anchor means, and means for positively preventing a non-collapsing condition of said collapsing link when disposed in its extended position.

3. The plug valve and actuator combination as defined in claim 2, wherein said collapsing link comprises two U-shaped bails, the stems thereof pivotally connected to said anchor means, said means for positively preventing a non-collapsing condition of said link comprising a bracket hinging the center portions of said U-shaped bails, and having portions cooperating with said bails limiting extension thereof to less than a 180° disposition.

4. The plug valve and actuator combination as defined in claim 1, wherein said motion transmitting means comprises an elongate rod rigidly secured at said one end to said one of said diaphragms.

5. The plug valve and actuator combination as defined in claim 4, wherein said pivot connection between the other end of said motion transmitting means and said plug control lever comprises a cooperating pin and aperture connection between the outer free end of said elongate rod and said plug control lever.

6. The plug valve and actuator combination as recited in claim 5, wherein said cooperating pin and aperture connection between the outer free end of said elongate rod and said plug control lever comprises an L-shaped extension formed on said elongate rod free end and means defining a mating aperture for said L-shaped extension in the outer free end of said plug control lever.

7. The combination of a rotary plug valve, an expansible chamber motor actuator and a common support mounting both said valve and actuator in assembled operative relationship; said valve including a housing rigidly secured to said support and a control lever to rotate said plug; said actuator comprising housing means secured to said support, at least two diaphragms mounted within said housing to define two operating chambers, one of said chambers located in the space between the two diaphragms, said diaphragms cooperating with said housing to provide fluid tight isolation between said operating chambers, means providing fluid communication through said housing into each of said operating chambers from the exterior of said housing, motion transmitting means secured at one end to one of said diaphragms exterior of said operating chambers and projecting exterior of said housing, means coacting with said diaphragms urging them in a direction causing maximum extension of said motion transmitting means from said housing including a collapsible device located between and connected to said two diaphragms enabling said diaphragms to move relatively away from and toward each other between a substantially fixed maximum distance and a closely spaced adjacent disposition of said two diaphragms and resilient expansion coil spring means disposed in said operating chambers, said coil spring means together urging said diaphragms toward a maximum volume condition of said operating chambers; and a pivot connection between the other end of said motion transmitting means and said plug control lever; said collapsible device permitting tilting of at least said one of said diaphragms and said motion transmitting means relative to said actuator housing means to accommodate an arcuate swinging of said pivot connection about the axis of the rotary plug of said rotary plug valve as the actuator moves said rotary plug through an intermediate flow control position between its operating limit positions.

8. The plug valve and actuator combination as defined in claim 7, wherein said means providing fluid communication through said housing into each of said operating chambers from the exterior of said housing comprise independent piping means connected to independent vacuum sources for selective and combined evacuation of said operating chambers against the urging of said resilient expansion coil spring means.

9. The combination of a rotary plug valve, an expansible chamber motor actuator and a common support mounting both said valve and actuator in assembled operative relationship; said valve including a housing rigidly secured to said support and a control lever to rotate said plug; said actuator comprising housing means secured to said support, at least two diaphragms mounted within said housing to define two operating chambers, one of said chambers located in the space between the two diaphragms, said diaphragms cooperating with said housing to provide fluid tight isolation between said operating chambers, means providing fluid communication through said housing into each of said operating chambers from the exterior of said housing, motion transmitting means secured at one end to one of said diaphragms exterior of said operating chambers and projecting exterior of said housing, means coacting with said diaphragms urging them in a direction causing maximum extension of said motion transmitting means from said housing including a collapsible device located between and connected to said two diaphragms enabling said diaphragms to move relatively away from and toward each other between a substantially fixed maximum distance and a closely spaced adjacent disposition of said two diaphragms; said housing means further comprise a spacer ring between said diaphragms urging the peripheries of said diaphragms into fluid seal relationship with said housing, one of said means providing fluid communication into said operating chambers comprising a portion of said spacer ring and including a fluid passageway through said spacer ring to said space between the two diaphragms: additional spacing means located between said diaphragms for preventing a fluid tight seal of one diaphragm against the other when said diaphragms are in said closely spaced adjacent disposition; a pivot connection between the other end of said motion transmitting means and said plug control lever; and said collapsible device permitting tilting of at least said one of said diaphragms and said motion transmitting means relative to said actuator housing means to accommodate an arcuate swinging of said pivot connection about the axis of the rotary plug of said rotary plug valve as the actuator moves said rotary plug through an intermediate flow control position between its operating limit positions.

10. The combination of a rotary plug valve, an expansible chamber motor actuator and a common support mounting both said valve and actuator in assembled operative relationship; said valve including a housing rigidly secured to said support and a control lever to rotate said plug; said actuator comprising housing means secured to said support, at least two diaphragms mounted within said housing to define two operating chambers, one of said chambers located in the space between the two diaphragms, said diaphragms cooperating with said housing to provide fluid tight isolation between said operating chambers, means providing fluid communication through said housing into each of said operating chambers from the exterior of said housing, motion transmitting means secured at one end to one of said diaphragms exterior of said operating chambers and projecting exterior of said housing, means coacting with said diaphragms urging them in a direction causing maximum extension of said motion transmitting means from said housing including a collapsible device located between and connected to said two diaphragms enabling said diaphragms to move relatively away from and toward each other between a substantially fixed maximum distance and a closely spaced adjacent disposition of said two diaphragms; a pivot connection between the other end of said motion transmitting means and said plug control lever; said collapsible device comprising diaphragm support plate means secured to each of said diaphragms in facing relationship, anchor means on each of said support plate means, a collapsing link secured to both of said anchor means, and means for positively preventing a non-collapsing condition of said collapsing link when disposed in its extended position; and said collapsing link comprising two U-shaped bails, the stems thereof pivotally connected to said anchor means, said means for positively preventing a non-collapsing condition of said link comprising a bracket hinging the center portions of said U-shaped bails, and having portions cooperating with said bails limiting extension thereof to less than a 180° disposition: said collapsible device permitting tilting of at least said one of said diaphragms and said motion transmitting means relative to said actuator housing means to accommodate an arcuate swinging of said pivot connection about the axis of the rotary plug of said rotary plug valve as the actuator moves said rotary plug through an intermediate flow control position between its operating limit positions.

* * * * *